United States Patent
Thomas

(10) Patent No.: US 7,594,032 B2
(45) Date of Patent: Sep. 22, 2009

(54) METHOD AND SYSTEM FOR COMMUNICATING INFORMATION BETWEEN A SWITCH AND A PLURALITY OF SERVERS IN A COMPUTER NETWORK

(75) Inventor: David Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1385 days.

(21) Appl. No.: 10/289,282

(22) Filed: Nov. 7, 2002

(65) Prior Publication Data

US 2004/0090966 A1    May 13, 2004

(51) Int. Cl.
*G06F 15/16* (2006.01)

(52) U.S. Cl. ............ 709/246; 709/217; 709/218; 709/219; 709/227; 709/228; 709/229; 709/238

(58) Field of Classification Search ......... 709/223, 709/217–219, 227–229, 238, 246
See application file for complete search history.

(56) References Cited

U.S. PATENT DOCUMENTS

| | | | |
|---|---|---|---|
| 5,787,249 A | | 7/1998 | Badovinatz et al. |
| 5,964,857 A | | 10/1999 | Srinivasan et al. |
| 6,006,264 A | * | 12/1999 | Colby et al. ............ 709/226 |
| 6,449,647 B1 | * | 9/2002 | Colby et al. ............ 709/226 |
| 6,654,786 B1 | * | 11/2003 | Fox et al. ................ 709/203 |
| 6,876,656 B2 | * | 4/2005 | Brewer et al. .......... 370/392 |
| 6,963,931 B2 | * | 11/2005 | Bunn et al. ............. 709/246 |
| 7,123,613 B1 | * | 10/2006 | Chawla et al. .......... 370/389 |
| 7,130,314 B2 | * | 10/2006 | Bunn et al. ............. 370/474 |
| 7,254,626 B1 | * | 8/2007 | Kommula et al. ........ 709/223 |
| 2003/0097481 A1 | * | 5/2003 | Richter ................... 709/251 |
| 2004/0039820 A1 | * | 2/2004 | Colby et al. ............ 709/226 |
| 2004/0068681 A1 | * | 4/2004 | Smith ..................... 714/43 |

OTHER PUBLICATIONS

"Locality-Aware Request Distribution in Cluster-Based Network Servers," by Vivek S. Pai, et al. (Proceedings of the ACM Eighth International Conference on Architectural Support for Programming Languages and Opearting Systems (ASPLOS-VIII), Oct. 1998).
"Interconnections, Second Edition,", Table of Contents and Preface, by Radia Perlman (Addison-Wesley, 2000).
Oliver Spatscheck, et al., "Optimizing TCP forwarder performance," IEEE/ACM Transactions on Networking, vol. 8, No. 2, pp. 146-157, Apr. 2000.
Scalable Content-aware Request Distribution in Cluster-based Network Servers, by Mohit Aron et al., Department of Computer Science, Rice University, Houston, Texas 77005, 15 pgs., 2000.

* cited by examiner

*Primary Examiner*—Liangche Alex Wang

(57) ABSTRACT

A method and system are disclosed for communicating information between a switch and a plurality of servers in a computer network. In accordance with exemplary embodiments of the present invention, a first server constructs an original state of an information packet for transmitting client information to a client on a connection between the client and the server through the switch. The first server modifies a header of the information packet to include computer network information for use by the switch. The first server transmits the modified information packet to the switch. The switch extracts the computer network information from the modified information packet.

25 Claims, 4 Drawing Sheets

METHOD AND SYSTEM FOR COMMUNICATING INFORMATION BETWEEN A SWITCH AND A PLURALITY OF SERVERS IN A COMPUTER NETWORK

CROSS REFERENCE TO RELATED APPLICATIONS

This application is related to U.S. Patent Application entitled "Method and System for Managing Fragmented Information Packets in a Computer Network," Ser. No. 10/289,308, to U.S. Patent Application entitled "Method and System for Managing Connections in a Computer Network," Ser. No. 10/289,288, to U.S. patent application entitled "Method and System for Reestablishing Connection Information on a Switch Connected to a Plurality of Servers in a Computer Network," Ser. No. 10/289,311, to U.S. Patent Application entitled "Method and System for Managing Communication in a Computer Network Using Aliases of Computer Network Addresses," Ser. No. 10/289,379, and to U.S. patent application entitled "Method and System for Predicting Connections in a Computer Network," Ser. No. 10/289,259, each of which is filed even date herewith and each of which is hereby incorporated herein by reference in its entirety.

BACKGROUND

1. Field of the Invention

The present invention relates to computer networks. More particularly, the present invention relates to a method and system for communicating information between a switch and a plurality of servers in a computer network.

2. Background Information

To access information on the Internet and, more particularly, the World Wide Web (WWW), users access websites that offer information and/or services. The information and/or services offered by a website are stored in and provided by computer network servers that are generally located remotely from the user. As the number of Internet users grow, computer network servers can experience an increase in the number of connections from clients to access the information and/or services available on these websites. To handle the increased connection load, the computer network servers can be scaled to meet the increased demand. For example, computer network servers can be replicated and the server replicas can be clustered to meet the increased demand. Thus, as the client connection load increases, more servers can be replicated and clustered. Because of their scalability and flexibility, computer network server clusters have become a popular method of meeting increasing communications traffic demands.

Computer network servers based on clusters of workstations or personal computers (PCs) generally include a specialized "front-end" device that is responsible for distributing incoming requests from clients to one of a number of "back-end" nodes, where the "back-end" nodes are responsible for processing the incoming requests from the clients. The front-end is responsible for handing off new connections and passing incoming data from the client to the back-end nodes. In cluster server architectures, the front-end can use weighted round-robin request distribution to direct incoming requests to the back-end nodes. With weighted round-robin distribution, incoming requests are distributed in round-robin fashion and are weighted by some measure of the load on the different back-ends.

To distribute the communications traffic among the back-end nodes, the front-end acts as a load balancer that attempts to evenly distribute the communications traffic load from the clients among the available back-end nodes. A load balancer can be, for example, a switch that connects the servers to the clients for whom the information and/or services are to be provided. To meet increasing connection loads, the load balancers can be upgraded with faster computer processors and more internal computer memory. To further increase performance and improve connection distribution among the back-end nodes, the front-end can use, for example, the content requested, in addition to information about the load on the back-end nodes, to choose which back-end server will handle a particular request.

Content-based request distribution is discussed in, for example, "Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), Oct.1998), the disclosure of which is incorporated herein by reference in its entirety. However, current load balancers (e.g., front-end switches) do not use the resources offered by the back-end server nodes, which are typically faster and more powerful than the load balancers, to assist the load balancer in determining the distribution of the connections among the back-end nodes. Rather, current load balancers determine request distribution autonomously from the back-end nodes.

One example of a conventional load balancer that can act as a front-end for a computer network cluster is a Layer Four (L4) switch. A L4 switch takes into account Transport Layer information (i.e., Layer Four of the International Organization for Standardization (ISO) Networking model, or ISO model). A discussion of computer network protocols and layers of the ISO model is discussed, for example, in "Interconnections, Second Edition," by Radia Perlman (Addison-Wesley, 2000), the disclosure of which is incorporated herein by reference in its entirety. L4 switches manipulate both the network and transport protocol headers of the communications traffic passing through them to forward the communications traffic to the back-end nodes. A L4 switch can operate with, for example, the Internet Protocol (IP) for the network layer and the Transport Control Protocol (TCP) for the transport layer.

To efficiently distribute the connection load between the back-end servers, the switch gathers load information autonomously from the servers. Communicating information from the back-end servers to the switches to assist the switch in load balancing can introduce a significant overhead in information transmission between the back-end servers and the switch. For example, a load balancer for WWW traffic can experience a workload of short-lived connections, with each connection having a small number of packets. Injection of additional "control packets" to communicate load information from the back-end servers to the switch can contribute a significant overhead to connections with short exchanges.

SUMMARY OF THE INVENTION

A method and system are disclosed for communicating information between a switch and a plurality of servers in a computer network. In accordance with exemplary embodiments of the present invention, a first server constructs an original state of an information packet for transmitting client information to a client on a connection between the client and the server through the switch. The first server modifies a header of the information packet to include computer network information for use by the switch. The first server transmits the modified information packet to the switch. The switch extracts the computer network information from the modified information packet.

Exemplary embodiments of a system for communicating information in a computer network include a first server of a plurality of servers for constructing an original state of an information packet for transmitting client information to a client on a first connection between the client and the first server, for modifying a header of the information packet to include computer network information, and for transmitting the modified information packet; and a switch, connected between the client and the plurality of servers, for receiving the modified information packet from the first server, for extracting the computer network information from the modified information packet; and for using the computer network information from the first server.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
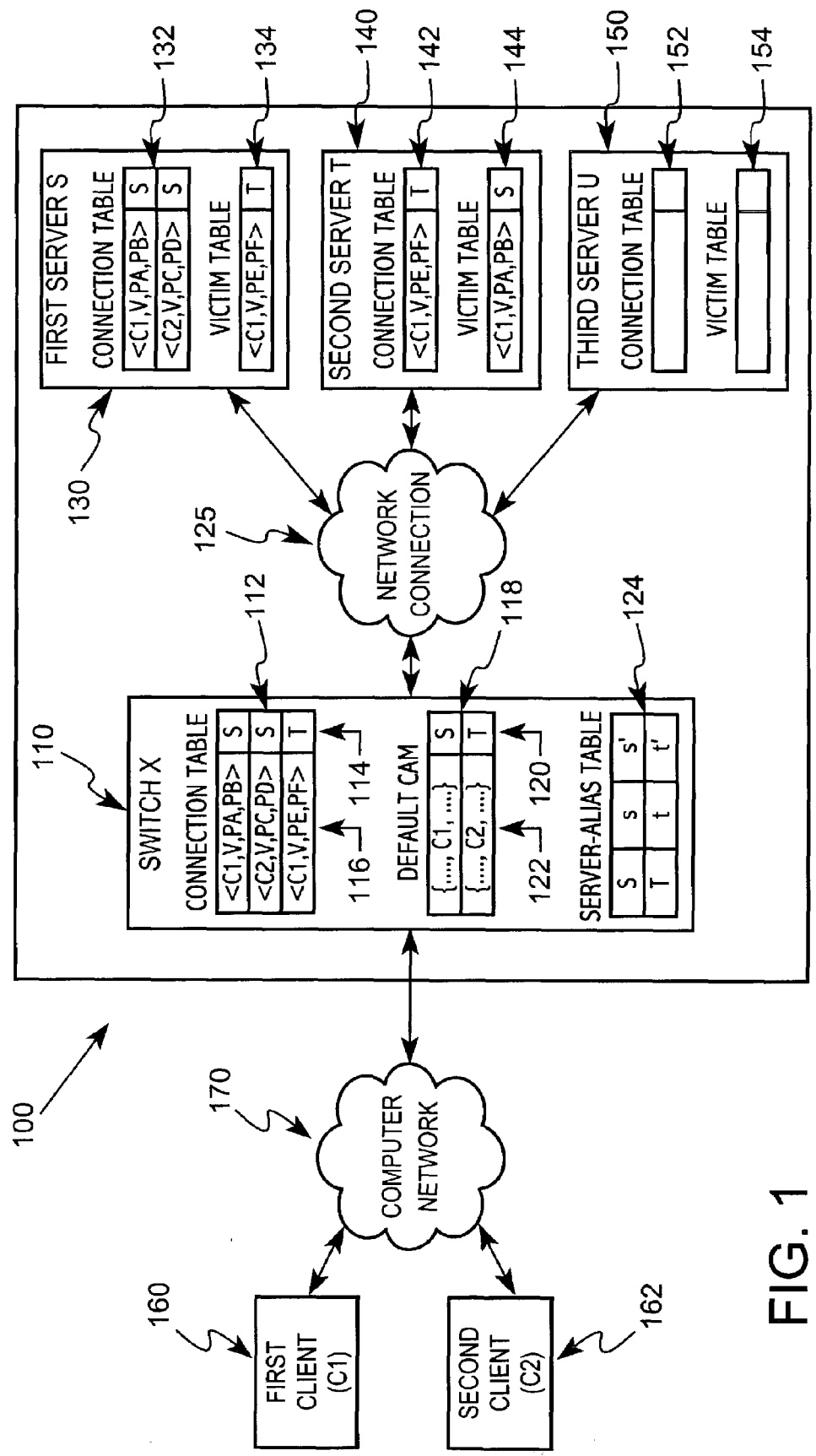
FIG. 1 is a block diagram illustrating a system for communicating information between a switch and a plurality of servers in a computer network in accordance with an exemplary embodiment of the present invention.

FIG. 1 is a block diagram illustrating a system 100 for managing communication in a computer network in accordance with an exemplary embodiment of the present invention. System 100 includes a first server 130 of a plurality of servers for constructing an original state of an information packet for transmitting client information to a client 160 on a first connection between the client 160 and the first server 130, for modifying a header of the information packet to include computer network information, and for transmitting the modified information packet.

An exemplary IP header is as follows:

ence of, or the providing of, information to a switch for use by the switch. The modifications can include information that is "piggybacked" on network traffic for use by the switch. The modifications can be used to cause the switch to recognize portions of the header and/or data portions, which may or may not have also been modified, as computer network information to be used by the switch.

In one example, the computer network information includes a code violation introduced to the information packet by the server, to indicate to the switch that the information packet contains information in other fields (which may or may not have been modified by the server) for use by the switch. Before passing the information packet to a client, the switch can extract the computer network information for its own use, and then remove the code violation from the information packet, leaving other portions of the information packet in their original state. In an exemplary embodiment, bits of the original state can be used as both computer network information at the switch, and as information that is passed along to the client. Additional details regarding the foregoing functionality will be discussed with respect to FIG. 1.

The FIG. 1 system 100 includes a switch 110, connected between the client 160 and the plurality of servers, for receiving the modified information packet from the first server 130, for extracting the computer network information from the modified information packet, and for using the computer network information from the first server 130. Upon extracting the computer network information, the switch can remove any modified portions of the invention packet to return the information packet to the original state.

Exemplary embodiments can use existing information packet headers to supply control information from any of the plurality of servers to the switch (e.g., portions of the headers that are unused in conveying information from the server to a client through the switch). In contrast to a dedicated control information packet sent from the server to the switch, exemplary embodiments exploit the use of traffic between the servers and clients to piggyback control information, thereby reducing (e.g., eliminating) traffic associated with the supply of control information to the switch.

According to exemplary embodiments, the FIG. 1 computer network 170 can be any type of computer network in which information in the form of packets can be transmitted, received, or otherwise communicated within and throughout the computer network. For example, computer network 170 can be a local area network (LAN), wide area network (WAN), any type of intranet or internet, or any other type of computer network or computer system capable of transporting packets of information.

| 4-bit version | 4-bit header length | 8-bit Type of Service | | | 16-bit total length |
|---|---|---|---|---|---|
| 16-bit identification | | 0 | D F | M F | 13-bit fragment offset |
| 8-bit TTL | 8-bit protocol | 16-bit header checkum | | | |
| 32-bit source IP address | | | | | |
| 32-bits destination EP address | | | | | |

As referenced herein, the "original state" of the information packet is any state other than one which includes modifications made by the server for use in identifying the presence of, or the providing of, information to a switch for use by As used herein, an "information packet" can be any format of aggregated bits that forms a protocol data unit (PDU) that is capable of carrying any type of information over a packet-switching network. The information packet can carry, for example, data, commands, or any other type of information. According to exemplary embodiments, an information packet can be a transmission control protocol (TCP) PDU, a user datagram protocol (UDP) PDU, or any other form of packet that is capable of carrying any type of information over a packet-switching network.

Switch 110 can receive an information packet through computer network 170 from a client, such as, for example, first client 160, second client 162, or any number of clients. As used herein, a "client" can be any type of computer system, such as, for example, a personal computer (PC), a workstation, a minicomputer, a supercomputer, or any other form of computer system capable of transmitting and receiving information packets over a computer network. According to exemplary embodiments, the client can request, for example, information or services from one or more of the plurality of servers over the computer network. Switch 110 can be connected to the clients remotely. If connected remotely, computer network 170 can be any form of WAN or for example, the Internet. However, switch 110 can be connected to the clients locally using, for example, a LAN or a direct connection to switch 110.

System 100 includes a plurality of servers (e.g., first server 130, second server 140, third server 150, and the like). According to exemplary embodiments, a primary network address and at least a secondary network address are assigned to each of the plurality of servers. The secondary network address of each of the plurality of servers is an alias for the primary network address of each of the plurality of servers. According to exemplary embodiments, each of the plurality of servers can be any type of computer system, such as, for example, a personal computer (PC), a workstation, a minicomputer, a supercomputer, or any other form of computer system capable of transmitting and receiving information packets over a computer network. According to exemplary embodiments, each server of the plurality of servers can provide, for example, information or services to one or more clients over a computer network in response to requests from the one or more clients for such information or services. System 100 can include any number of servers.

The plurality of servers can be connected to switch 110 through a network 125. Network 125 can be any type of computer network where the Layer 2 header is preserved (for example, a LAN, WAN, or any form of intranet where the Layer 2 header is preserved). The plurality of servers can be connected to switch 100 through network 125 using any form of computer network connection, such as, for example, an Ethernet connection. According to an alternate embodiment, the plurality of servers can be connected directly to switch 110 using any form of connection (e.g., electrical, optical, wired, wireless or the like) capable of transmitting and receiving information between the plurality of servers and switch 110. In such an alternate embodiment, the network connection of network 125 is a direct connection. According to exemplary embodiments, although the plurality of servers can communicate with the clients through switch 110, the plurality of servers can send additional information packets to clients through computer network 170 using alternate mechanisms. For example, the plurality of servers can also include additional network interfaces that connect each of the servers to computer network 170 so that computer network communication can take place without the use of switch 110.

According to exemplary embodiments, switch 110 can be a Layer 4 (L4) switch. A L4 switch takes into account Transport Layer Information (i.e., Layer 4 of the ISO model). For example, the L4 switch can examine port numbers of the TCP protocol, although switch 110 can use other transport and network protocols, such as, for example, UDP. A switch can operate at the Data Link Layer (i.e., Layer 2 of the ISO model). An exemplary Data Link Layer is Ethernet. An Ethernet switch can forward packets without modification.

In contrast to a switch, a router can operate at the Network Link Layer (i.e., Layer 3 of the ISO model). An example of a Network Link Protocol is the Internet Protocol (IP). A network router can interconnect different link layers and generate a new link layer header for each packet passing through the network router. A network router can also manipulate the IP header of packets passing through the network router.

Switch 110 can be a hybrid of the Ethernet switch and the network router. For example, switch 110 can rewrite or otherwise manipulate the link layer header of information packets, but does not modify information packets in the manner performed by routers. According to exemplary embodiments, switch 110 can use the IP protocol for the network layer and the TCP protocol for the transport layer, although different protocols can be used for the various layers.

Switch 110 can store, maintain, and manage several tables that can be used to forward information packets between the clients and the plurality of servers. Each table is a collection of information that can be stored in any type of computer memory in switch 110, such as, for example, Random Access Memory (RAM), a hard disk, or any other type of electronic storage medium. For each table, a key/value pair can be used to access information—the key is used to index and locate information in the table and the value is associated with the key.

A table that can be maintained by switch 110 is a connection table 112. Connection table 112 maps connections switch 110 has been informed about to the server that is handling the connection, wherein information packets are communicated between a client and a server of the plurality of servers over the connection. Value field 114 of connection table 112 can hold the name, address or any other designation of a server. Key field 116 can be used to index or otherwise locate the value in value field 114 that corresponds to the particular key field. According to an exemplary embodiment, connection table 112 can be a hash table maintained in RAM of switch 110.

According to exemplary embodiments, another table that can be maintained by switch 110 is a default content addressable memory (CAM) 118. Default CAM 118 can provide, for example, an initial assignment of connections to servers and it can provide the mapping of non-first fragments to servers. According to exemplary embodiments, default CAM 118 can be a ternary CAM.

A role of the default CAM, according to exemplary embodiments of the present invention, is to implement a dispersal algorithm for handling the absence of connection information in the connection table. The default CAM can be accessed during an initial assignment of connections as mentioned, but can also be accessed when connection information has been lost, deleted, or rendered inaccessible from the connection table for any reason. The dispersal algorithm can be established at the switch by the system in advance, or can be established at the switch by having at least one of the plural servers notify the switch of the dispersal algorithm to be used for allocating computer network address space of the plural servers. In this latter case, a first server can run the dispersal algorithm on all of its connections, and inform all of its potential victim servers of the connections each such victim server will be handling for the first server. Each of the remaining servers can do the same.

An exemplary dispersal algorithm can be a predetermined pattern matching algorithm implemented using a ternary CAM (or other desired mechanism). In a scenario where information (e.g., first information) is directed to the switch from a client, but there is no connection information in the connection table of the switch, the default CAM can be accessed to identify an appropriate so-called victim server to which the first information packet should be forwarded. The servers handle the forwarding of the first information packet from the victim server to the appropriate destination server. A ternary CAM is suitable for use as the default CAM because it is a content addressable memory with "don't care" matching to provide wildcards on various fields of value field 120 as accessed by key field 122. Thus, the ternary CAM can provide pattern matching. If a value matches several patterns in default CAM 118, a priority encoder can be used to determine the result. Priority encoders are described, for example, in U.S. Pat. No. 5,964,857, the entire disclosure of which is hereby incorporated herein.

For example, each information packet can include a connection tuple having a designated number of bits used to represent at least five fields for specifying a source Internet Protocol (IP) address, a destination IP address, a source port, a destination port and a protocol. These bits can be considered to designate an address space that can be allocated among the plural servers. In the absence of connection information in the connection table, the default CAM can be accessed to determine a match on a selected number of these bits (e.g., a match on the four least significant bits of the source IP address whereby a first portion of the address space from "0000" to "0011" can be allocated to a first of four servers). The information packet is thus forwarded to the server preassigned to handle any information packets within the first portion of the address space. The servers can have a preestablished mechanism (e.g., victim tables) for forwarding information packets from a particular victim server to an appropriate destination server.

As an alternate to using predetermined pattern matching, the dispersal algorithm can, for example, be a hash function. That is, any or all of the bits received in an information packet can be used to calculate an entry to a hash table, which in turn, designates an appropriate victim server.

In addition to the connection table and the default CAM, another table that can be maintained by switch 110 is a server-alias table 124. According to exemplary embodiments, server-alias table 124 can perform several functions. For example, server-alias table 124 can contain a list of the plurality of servers. The name, address or other designation of each of the servers can be the value accessed by a key to index or otherwise locate information in the server-alias table (e.g., the Ethernet address corresponding to the IP address of a server). As discussed below, server-alias table 124 can also contain a list of alias addresses for servers that are used by the switch.

According to exemplary embodiments, each of the plurality of servers can also store, maintain, and manage several tables for connection management. Each table is a collection of information that can be stored in any type of computer memory in each of the plurality of servers, such as, for example, Random Access Memory (RAM), a hard disk, or any other type of electronic storage medium. For each table, a key/value pair can be used to access information—the key is used to index and locate information in the table and the value is associated with the key.

Each of the plurality of servers can have a connection table, such as, for example, connection table 132 of first server 130. The server connection table can contain a list of the connections for which the server is the terminating server. In other words, the server connection table lists those connections that the server is handling. Each of the plurality of servers can also include a victim table, such as, for example, victim table 134 of first server 130. The victim table can contain the connection and fragment information that the server handles on behalf of another server. In other words, the victim table lists the non-terminating connections on which the server will receive packets. For each of the information packets received on the non-terminating connection, the victim table lists the terminating server to which the non-terminating server can relay the information packets. As already mentioned, the victim tables can be populated as a function of the selected dispersed algorithm.

For purposes of illustration, as shown in FIG. 1, IP addresses are denoted by uppercase letters (e.g., C1, C2, S, T, U). Ethernet addresses (i.e., Medium Access Control (MAC) addresses) are denoted by lowercase letters (e.g., c1, c2, s, t, u). As discussed below, switch 110 can masquerade as a server to pass server address information from one server to another. When switch 110 masquerades as a server, it can use alias addresses denoted by lowercase letters with apostrophes (e.g., s', where s' is an alias for s).

Switch 110 can connect a plurality of servers to clients over computer network 170. Thus, the switch can act as a "front-end" to the plurality of servers, while the plurality of servers can act as the "back-end." IP aliasing can be used when communicating information packets between the plurality of servers and the clients through switch 110. With IP aliasing, switch 110 and the plurality of servers are addressed to clients using a single, collective IP address (e.g., an address "V"). In other words, switch 110 and the plurality of servers appear as a single computer system with a single IP address (e.g., address "V"), such that "knowledge" of the separate components of system 100 is hidden from the clients.

Thus, when a client addresses switch 100 and plurality of servers, the client simply sends an information packet to a single IP address (e.g., address "V"). Switch 110 will then direct the packet to the server handling the connection to the client. When sending information packets to clients using IP aliasing, each of the plurality of servers can write the IP source address as the single, collective IP address (e.g., address "V"), and not the server's unique IP address. However, according to exemplary embodiments, at the Ethernet layer, each of the plurality of servers can use their individual Ethernet addresses (i.e., MAC address) as their source Ethernet address.

According to exemplary embodiments, amongst the Layer 2 (L2) (i.e., Ethernet) packet layer, Layer 3 (L3) (i.e., IP) packet layer, and the L4 (e.g., TCP) packet layer, there are six fields which can used to represent packets in system 100: an Ethernet destination address (from the L2 packet layer); an Ethernet source address (from the L2 packet layer); a source IP address (from the L3 packet layer); a destination IP address (from the L3 packet layer); a source port (from the L4 packet layer); and a destination port (from the L4 packet layer). Those skilled in the art will appreciate that an additional protocol field can be included (e.g., to identify TCP), and need not be discussed further. For purposes of illustration and not limitation, a packet from first client 160 (i.e., "C1") to system 100 (i.e., "V") can have the following fields, where "s" represents the Ethernet address of first server 130, "x" represents the Ethernet address of switch 110, and "PA" and "PB" are the source and destination TCP ports, respectively: [x, c1, C1, V, PA, PB]. For example, if first server 130 is handling the connection, the switch 110 can rewrite the packet as: [s, x, C1, V, PA, PB]. When the server sends a reply, the server uses the IP alias "V" instead of its own IP address. Consequently, the reply packet is: [x, s, V, C1, PB, PA].

As noted, the reply packet swaps the source and destination IP addresses. From this swapping, a canonical addressing format can be used to represent packets as follows: <client IP address, server IP address, client port, server port>. The canonical addressing format can be used to represent packets and connections in system 100 of FIG. 1. According to exemplary embodiments, if the packet came from a client, then the fields are in canonical form. If the packet came from a server, then the fields can be swapped to generate the canonical form.

Switch 110 can use server-alias table 124 to determine if the packet was sent by a server, and, therefore, the fields should be rearranged. If "V" is the source IP address, then the fields should be swapped. By using a canonical form in accordance with exemplary embodiments, connection table 112 can use a single entry to track a connection for each packet direction. Alternatively, two indices can be used—one for each packet direction.

To modify an information packet and thereby communicate computer network information, such as control information, from the servers to the switch 110 in accordance with an exemplary embodiment, at least a first server of a plurality of servers in the FIG. 1 system is provided for constructing an original state of an information packet for transmitting client information to a client on a first connection between the client and the first server. The server modifies a header of the information packet (that is, any portion of the information packet which the switch will examine) to include at least a portion of the computer network information, and transmits the modified information packet. The switch 110, connected between the client and the plurality of servers, receives the modified information packet from the first server, extracts the computer network information from the modified information packet, and uses the computer network information from the first server.

At any time before forwarding the information packet, switch 110 can remove (e.g., return bits to their original state) modifications made to an information packet after the switch has extracted the computer network information to return the information packet to its original state. The switch only removes the portion of the modified information packet which was altered to supply control information to the switch and which would impact the manner by which the client processes the information packet. The switch forwards to the client the information packet from which the modifications have been removed. Thus, the switch can manage the connection table 112 or any table contained in the switch using, in whole or in part, control network information received from a server. The control network information can, for example, include information in fields already present in the original information packet. The fields can overlap control and data portions of the information packet.

The computer network information can be control information associated with the client information included in the information packet. The client can transmit an acknowledgment message to the first server through the switch in response to receiving the client information from the first server, wherein receipt of the acknowledgment message by the first server indicates to the first server that the switch received the modified information packet.

The computer network information can also be metric information associated with the plurality of servers. The metric information can, for example, be a connection load of the first server. Such information can be used, for example, as input information to the dispersal algorithm implemented at the switch for load balancing.

Alternately, or in addition, the computer network information can be control information that instructs the switch to modify connection information in the switch. For example, the computer network information can instruct the switch to delete connection information in the switch.

The computer network information can also include an alias of the computer network address of a second server. The switch can use the alias to reassign to the second server a connection from the client handled by the first server.

Alternately, the computer network information can instruct the switch to not generate connection information in the switch based on information packets transmitted over a connection from the first server to the client.

The computer network information can include predictive connection information for use by the switch for establishing a second connection between the client and a second server of the plurality of servers. For example, the predictive connection information can be determined by the first server using at least connection information associated with the first connection through the switch between the client and the first server, wherein the first connection is associated with the second connection. Predictive connection information can, however, be determined in any desired fashion. Predictive connection information can also be determined in a manner as described in U.S. Patent Application entitled "Method and System for Predicting Connections in a Computer Network", Ser. No. 10/289,259.

Alternately, or in addition, the first server can calculate a first verification value to be included in the information packet. For example, the first server can use client information to calculate the first verification value. The first verification value can, for example, be an Internet Protocol (IP) checksum. The first server can also calculate a second verification value to be included in the information packet. The first server can, for example, use the first verification value, the client information, and the computer network information to calculate the second verification value. For example, the second verification value can be an Ethernet checksum. The switch can recalculate the second verification value included in the information packet. The switch can use the first verification value and the client information to re-calculate the second verification value.

The first server can, of course, also construct the computer network information as a dedicated control information packet, for use by the switch, in an absence of information packets to be transmitted to the client, wherein the control information packet includes a deletion indicator and control information for the switch. The first server can transmit the control information packet to the switch. After the switch extracts the control information from the control information packet, the switch can delete the control information packet when the deletion indicator indicates that the control information packet is to be deleted. As with other computer network information described herein, the control information can, for example, be included in a header of the control information packet.

Exemplary computer network information can include a first command used to speculate an entry in the switch's connection table. For example, this command can be used to modify the contents of the default CAM, which directs information packets to servers when there is no connection entry in the connection table for a given information packet.

A second exemplary command is a command to delete a connection entry. In this case, the server has determined that the connection is no longer needed and that an associated connection tuple can be removed from the connection table, freeing that table entry. This can be considered a form of active table management.

A third command can be used for causing the switch to learn a connection entry. In this case a connection table entry exists, but the information packet has come from a different server than the one identified in the table. The information packet can, for example, be marked with control information to say that the switch should learn that the server whose address is in the packet is servicing this connection. Alternately, the switch 110 can be configured to perform this function as a default operation.

A fourth command can be used for causing the switch to refrain from learning a connection entry. For example, where an information packet has come from a different server to that held in the connection table of the switch, the control signal can be used to preclude the switch from learning the connection has moved. This feature can be used when moving a connection between servers, because the prior server used to service a connection can continue to send packets concurrently with the new server. This avoids a ping-ponging of the server entry for egress packets, and a potential for ingress packets to improperly end up on the prior server.

A fifth command can be used to redirect traffic to a different location. For example, the control information can be used to update a connection entry so that the server entry is pointing to some new location (e.g., a different server). In practice this can involve sending the server address to the switch using, for example, a server alias in the MAC source address. That is, the server alias MAC address can be carried as an alias in the Ethernet source address.

Finally, data of any type can be included in specific areas of the packet.

Another exemplary command which can be optionally included is a command used to drop an information packet. For example, a control packet, structured as a legitimate packet modified to include control information, can be sent. The information packet exists solely to communicate control information, and can share the regular packet format, but is not a packet intended for the client. The drop packet signal can be used in conjunction with any information packet.

Of course, any desired information can be conveyed to a switch in accordance with exemplary embodiments of the inventor.

To implement these commands and/or the conveyance of any desired information, an original state of an information packet can be modified to include a bit for signaling "drop packet" and one or more bits can be used to designate an operation (e.g., add, delete, learn, don't learn). The remaining information used to convey information for use by the switch can, for example, come from the preexisting packet header (e.g., the connection tuple is in the packet header).

To modify (e.g., piggyback) an original state of a standard information packet with control information, unused bits of the IP header can be exploited in an exemplary embodiment. Information used to modify the information packet can then be removed at the switch (e.g., by zero'ing it out). As already mentioned, the server can calculate any checksum that is used for verification before modifying an information packet so that the original state of the information packet can be verified at the switch upon removal of any modification. The modified information packet can also be separately verified using, for example the data link layer checksum (e.g., Ethernet checksum).

Where a coding violation is introduced in the IP header to identify information packets which carry information for use by the switch, there are several ways in which this coding violation can be accomplished. For example, an IP header can contain fields to specify: packet version (e.g., 4-bit field), header length (e.g., 4-bit field), type of service (TOS) (e.g., 8-bit field); total length of the information packet (e.g., 16-bit field), identification field (e.g., 16 bit field), fragment offset (e.g., 16-bit field), TTL (e.g., 8-bit field), protocol (e.g., 8-bit field), header checksum (e.g., 16-bit field), source IP address (e.g., 32-bit field) and destination IP address (e.g., 32-bit field).

The Type-Of-Service (TOS) field has been specified as a three bit precedence field, 4 TOS bits and an unused bit set to 0. The bit next to DF, has also been specified as 0. In an exemplary embodiment, these two bits can be specified as "must be 0"; accordingly, if either of these specified bits is altered by a server (e.g., changed to "1"), a coding violation is indicated, that signifies the information packet header includes information in a designated area for use by the switch.

Of course numerous possibilities exist for establishing header specifications that, if deviated from, would signal a coding violation to the switch. For example, the total length field refers to the length of the IP packets. On an exemplary Ethernet link layer, this can not be greater than 1500 bytes, so the top 5 bits of this field would be set to 0 in a correctly coded packet. Accordingly, some of these bits can be used to convey a code violation, and/or to provide the control information to the switch. These five bits can, for example, be used to encode a control command, and optionally indicate to the switch whether to drop the packet. For example, a specified "drop" bit can be set to "1" if the packet is to be dropped after the operation is performed by the switch.

In an exemplary embodiment, one of these five bits can be used to signify a modified header (i.e., signal to the switch that the information packet contains information for use by the switch), and a second of the five bits can be used to designate a "drop" (i.e., that the switch is to drop the packet after the information has been used by the switch, rather than forward the packet to another destination). The remaining three bits can be used to encode a command field with up to eight different commands, as follows:

| 0 | Null |
| 1 | Speculate |
| 2 | Delete |
| 3 | Learn |
| 4 | Don't learn |
| 5 | Redirect |
| 6 | Any Desired Command |
| 7 | Data |

The foregoing encoding is such that a null command combined with don't drop sets the top five bits to zero (e.g., where no command has been added to the information packet).

In exemplary embodiments, modified data can be included such that the fragment offset and the MF (more fragments) bits can be made available for encoding additional commands.

To carry additional bits needed by data (e.g., to carry speculative connection information), the destination port and the source port can be encoded in a manner as described in the copending application entitled "Method and System for Predicting Connections in a Computer Network", Ser. No. 10/289,259, filed on even date herewith.

Connection speculation can be used to make an informed guess about what future new connections might arrive at the switch, and speculate what the switch should do with these connections should they come into existence. Exemplary embodiments identify connections by five fields (source and destination IP addresses, source and destination ports and protocol). With connection speculation, a pattern matching facility can be included at the default CAM to establish masks that indicate bits of concern. For example, to match a specific IP address 10.0.0.1, a match of all bits can be required. Alternately, to match 10.0.0, a mask 0xffffff00 can be used to mask values of the bottom 8 bits.

For speculation, each field can be supplied as a specific value along with a set of masks stating which bits are to be matched. This can involve a large number of bits (e.g., 208 or lesser or greater). For piggybacking in accordance with an exemplary embodiment of the present invention, this information can be compressed to fit in a reduced bit set. For example:

- Regarding the source IP address (32 bits), speculation can be limited to traffic from a specific client.
- Regarding the destination IP address (32 bits), a single IP address (V) for a cluster can be used without a wildcard.
- Regarding the source port (16 bits), the source port can be assumed wild (e.g., encoded in zero bits).
- Regarding the destination port (16 bits), the destination port is likely to be one of a handful of well known port numbers (e.g., HTTP(80), FTP(20,21), etc.). The most significant port numbers can be encoded in three bits (a mapping table to 16 bits can be included on the switch).
- Regarding the protocol (8 bits), the value of the protocol field can be retained in the IP header; alternately, protocol can be inferred from the destination port.

Thus, a wildcard can be supplied for the source port. For the IP source and destination fields a connection can be used which has those fields in it already. As exemplary speculation mask for destination and protocol encoding is as follows:

| Encoding | Dest Port | Dest Mask | Protocol | Proto Mask |
|---|---|---|---|---|
| 0 | — | 0x0000 (wild) | Tcp | 0xff |
| 1 | — | 0x0000 (wild) | Udp | 0xff |
| 2 | From packet | 0xffff | From packet | 0xff |
| 3 | http (80) | 0xffff | Tcp | 0xff |
| 4 | ftp (21) | 0xffff | Tcp | 0xff |
| 5 | ftp (69) | 0xffff | Udp | 0xff |

Because there is a relationship between the destination port and the protocol, these fields can be jointly coded in fewer bits.

The source and destination IP addresses are already in the packet (0 additional encoding bits), and the protocol and the destination port can compress into 3 additional bits. These four fields are exact so no wild cards are needed. This leaves the source port, which if assumed to be wild, uses 0 bits to encode.

In addition to specifying the speculation criteria, the switch can be informed what to do with packets that match. The (Ethernet) address of the server to which the packet should be forwarded can be specified. For example, the MAC address of the server which will service the connection (if it comes into existence) can be carried as a server alias in the MAC source address.

In the foregoing table, the intention of "wild" is that the matching logic used in the default CAM will match any destination port that the client chooses.

The tcp and udp entries expand to their 16 bit value, and an exact match can be made on these fields.

An alternate embodiment recognizes source ports chosen by the client can be allocated sequentially and thereby allow the next port number the client will chose to be related to the port number in the packets exchanged with that client. For example, suppose a client is exchanging traffic with a server. That server speculates that the client will open another connection. Because of the anticipated sequential allocation of the client port, the client may allocate the next port (or one in close sequence). By piggybacking on a recent connection from the client, that packet header contains a recently allocated source port, and the anticipated port will be "nearby". The speculation table entry with the port number can be created from the packet, with a range of "future" ports.

An exemplary protocol source port compression is as follows:

| Encoding | Protocol Source Port | Wild mask |
|---|---|---|
| 0 | — | 0xffff |
| 1 | From packet | 0xffff |
| 2 | From packet | 0xfff0 |
| 3 | From packet | 0xffc0 |

The first entry (0) means match any protocol source port (all 16 bits in the mask are wild, i.e., don't care about their value).

The second entry (1) means an exact match on the protocol source port which is in the packet. This entry can be used with control packets.

Entry (2) means obtain the protocol source port number from the packet and match against exactly against the top 12 bits of incoming connections, the remaining four bits are wild carded. The client is anticipated to choose a port sequentially close to the port that is currently in use.

The last entry (3) is similar to entry 2, but matches the top 10 bits, and the bottom 6 are wildcarded.

In the foregoing table, "from packet" entries mean that the default CAM fields are set from the source port and protocol fields in the information packet destined for the client. This combined with the "drop packet" command provides a "get out" clause because a control packet can be generated when no suitable packet is available on which to piggyback, such that an exact match can be made on the source port field.

Thus, according to exemplary embodiments, an information packet can be modified by a server to include the computer network information that control the switch. Of course, any number of bits can be used (modified and/or exploited) to convey information to the switch for use by the switch.

Upon extracting the computer network information intended for the switch, the switch can remove any modified bits. For example, the top five bits of the total length field can be returned to their original state (e.g., zero). Any other bits modified to provide additional information exclusively to the switch would also be returned to their original state. For example, because the servers of this example do not send fragmented information packets, a fragmented offset field included in the information packet can be used to notify the switch of the server's load condition. This field can also be returned to its original state.

For example, where a server is to notify a switch of a connection table entry to be deleted on the switch, the server can send a dedicated control message as follows:

Header: server ID, switch ID, source port ID, destination port ID

Payload: delete connection information for an connection table entry:

<C, S, PA,PB> (where C is a client, S, is a server, and PA, PB are source and destination ports)

Where this connection is presently active (i.e., <C, S, PA, PB>), server S can send an information packet to client C with this format:

Header: C, S, PA, PB
    Payload: message to client

This latter information packet will thus share common fields with the header of the dedicated control message. Because of the exemplary network topology described herein, this information packet will pass through the switch. According to exemplary embodiments of the present invention, the information of the dedicated control message is woven into this information packet to decrease network traffic. This is achieved by exploiting unused bits and introducing a coding violation of the packet intended for the client.

For example, the information of the dedicated control message can be fused into a single information packet as follows:

Header: C, S [delete violation] PA, PB
    Payload: message to client

At the switch, the [delete violation] is removed along with any bits modified to encode the commands (e.g., fragment offset bits).

Exemplary embodiments of the present invention thus reduce network traffic. In addition, failure atomicity can be realized, because both the control message to delete the connection and the information packet destined for the client either both get to the switch (at the same time) or they don't get to the switch.

Figure 2:
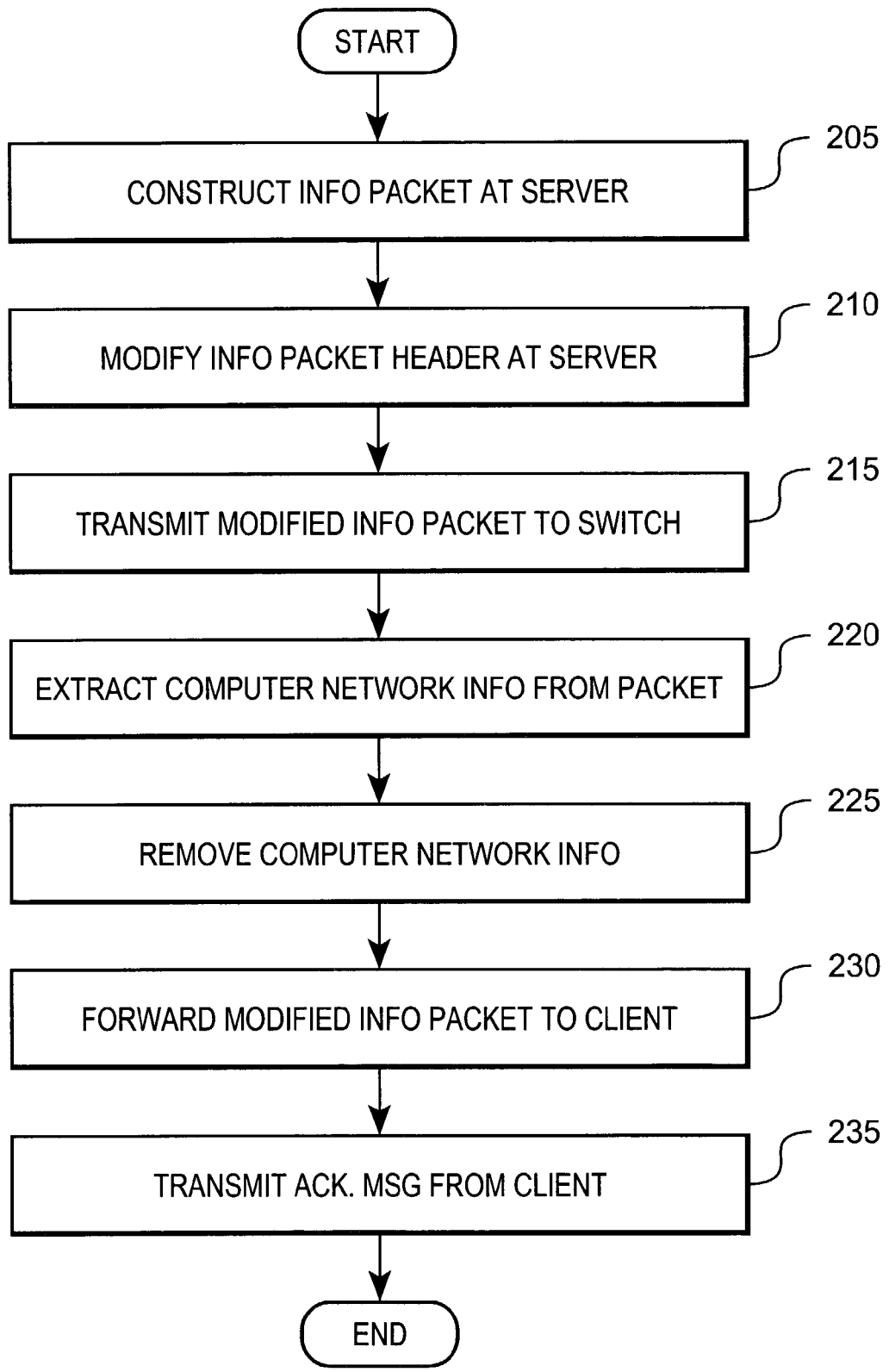
FIG. 2 is a flowchart illustrating a method for communicating information between a switch and a plurality of servers in a computer network in accordance with an exemplary embodiment of the present invention.

Referring to FIG. 2, an exemplary method for communicating information between a switch and a plurality of servers in a computer network includes constructing an information packet at a first server in step 205 for transmitting client information to a client on a first connection between the client and the first server through the switch. The first server modifies a header of the original state of the information packet to include computer network information for use by the switch in step 210. The first server transmits the modified information packet to the switch in step 215. The switch extracts the computer network information from the modified information packet in step 220.

The computer network information can be removed in step 225 from the modified information packet after the switch has extracted the computer network information from the modified information packet to return the information packet to the original state. In step 230, the switch forwards to the client, the information packet from which the computer network information has been removed.

In step 235, the client transmits an acknowledgment message to the first server through the switch in response to receiving the client information from the first server. Receipt of the acknowledgment message by the first server indicates to the first server that the switch received the modified information packet.

In exemplary embodiments, the constructing of an information packet can include a step 305 of calculating a first verification value (e.g., an IP checksum) to be included in the information packet. The calculation of the first verification value can, for example, use the client information. The first verification value can be used to ensure that an information packet has been properly returned to its original state.

A second verification value (e.g., an Ethernet checksum) can be calculated in step 310 to be included in the information packet. The calculation of the second verification value can use the first verification value, the client information, and the computer network information. The switch can recalculate the second verification value included in the information packet in step 315, wherein the re-calculation of the second verification value can use the first verification value and the client information.

Figure 4:
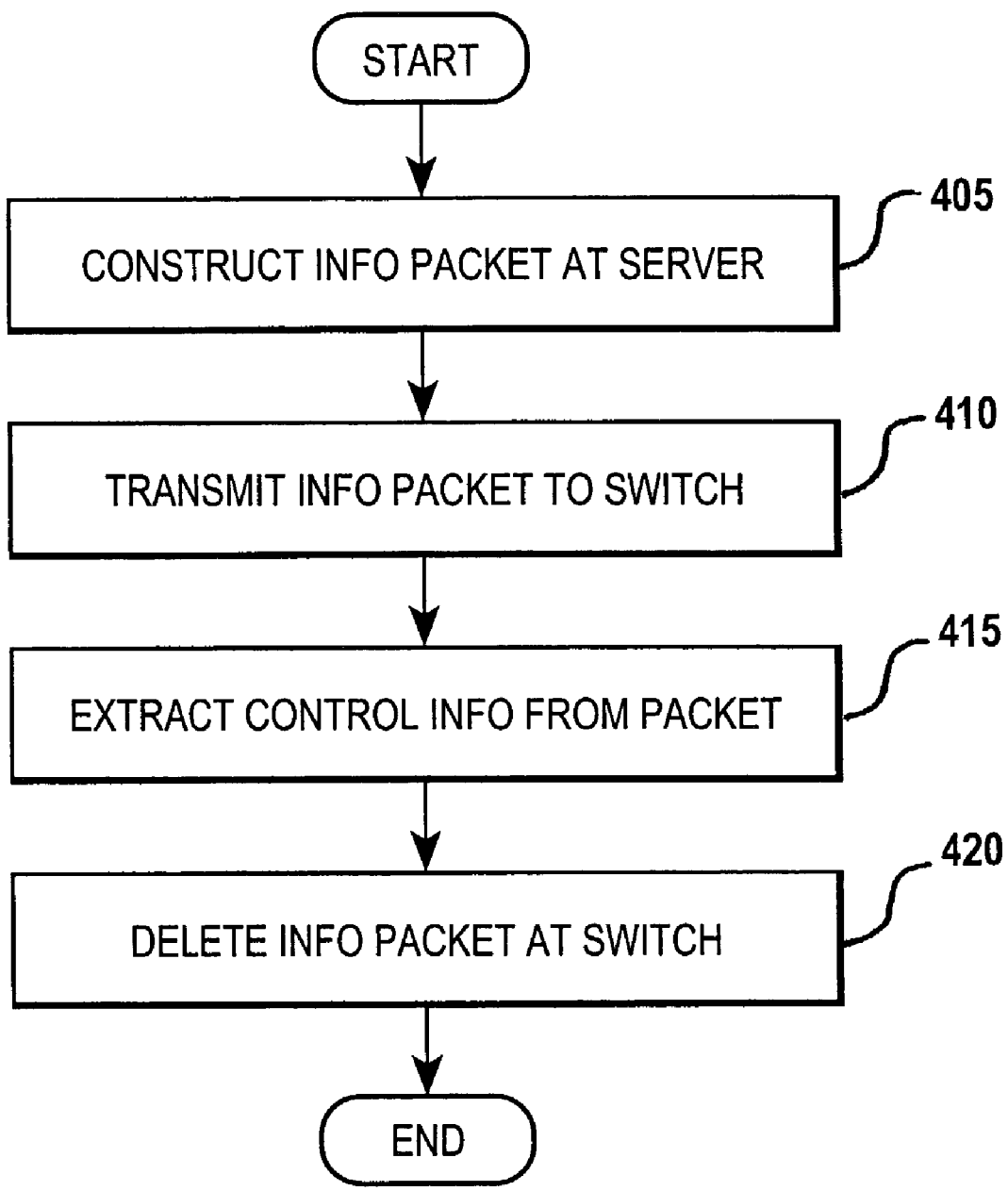
FIG. 4 is a flowchart illustrating a method for communicating information between a switch and a plurality of servers in a computer network in accordance with an alternate exemplary embodiment of the present invention.

Referring to FIG. 4, exemplary methods can also retain use of a control information packet at a first server in step 405, for use by the switch, in the absence of information packets to be transmitted to the client. The control information packet can include a deletion indicator and at least control information for the switch. The first server transmits the control information packet to the switch in step 410. The switch extracts the control information from the control information packet in step 415 and deletes the control information packet when the deletion indicator indicates that the control information packet is to be deleted by the switch in step 420.

Figure 3:
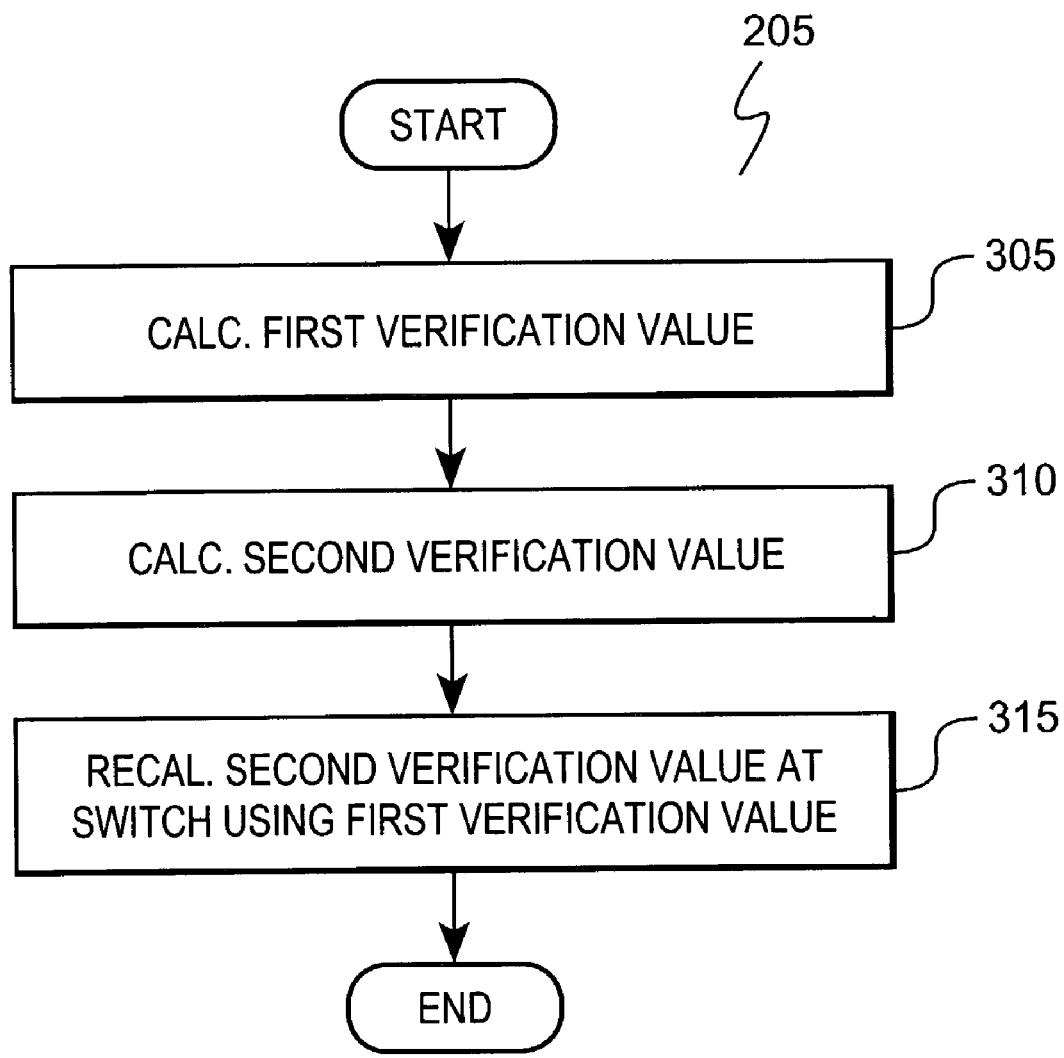
FIG. 3 is a flowchart illustrating a method for constructing an information packet for transmitting client information to a client on a first connection in accordance with an exemplary embodiment of the present invention.

The steps of a computer program as illustrated in FIGS. 2-4 for communicating information between a switch and a plurality of servers in a computer network can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for communicating information between a switch and a plurality of servers in a computer network, comprising:

constructing, at a first server, an original state of an information packet for transmitting client information to a client on a first connection between the client and the first server though the switch;

modifying, by the first server, a header of the information packet to include computer network information for use by the switch;

transmitting, by the first server, the modified information packet to the switch;

extracting, by the switch, the computer network information from the modified information packet;

wherein the constructing comprises: calculating a first verification value to be included in the information packet, wherein the calculation of the first verification value uses the client information; and calculating a second verification value to be included in the information packet, wherein the calculation of the second verification value uses the first verification value, the client information, and the computer network information.

2. The method of claim 1, comprising:
removing, by the switch, modifications made to the information packet after the switch has extracted the computer network information from the modified information packet, to return the information packet to the original state.

3. The method of claim 2, comprising:
forwarding to the client, by the switch, the information packet from which the computer network information has been removed.

4. The method of claim 3, comprising:
transmitting, from the client, an acknowledgment message to the first server though the switch in response to receiving the client information from the first server, wherein receipt of the acknowledgment message by the first server indicates to the first server that the switch received the modified information packet.

5. The method of claim 1, wherein the computer network information is control information associated with the client information included in the information packet.

6. The method of claim 1, wherein the information packet is a transmission control protocol (TCP) protocol data unit (PDU).

7. The method of claim 1, wherein the information packet is a user datagram protocol (UDP) protocol data unit (PDU).

8. The method of claim 1, wherein the computer network information is metric information associated with the plurality of servers.

9. The method of claim 8, wherein the metric information is a connection load of the first server.

10. The method of claim 1, wherein the computer network information is control information that instructs the switch to modify connection information in the switch.

11. The method of claim 10, wherein the computer network information instructs the switch to delete connection information in the switch.

12. The method of claim 1, wherein the first verification value is an Internet Protocol (IP) checksum.

13. The method of claim 1, wherein the second verification value is an Ethernet checksum.

14. The method of claim 1, comprising:
recalculating, by the switch, the second verification value included in the information packet, wherein the re-calculation of the second verification value uses the first verification value and the client information.

15. The method of claim 1, wherein the computer network information informs the switch that a connection has been moved from the first server of the plurality of servers to a second server of the plurality of servers.

16. The method of claim 1, wherein the computer network information instructs the switch to redirect client communications traffic from the first server to a second server of the plurality of servers.

17. The method of claim 16, wherein the computer network information includes an alias of the computer network address of the second server.

18. The method of claim 1, wherein the computer network information instructs the switch to not generate connection information in the switch based on information packets transmitted over a connection from the first server to the client.

19. The method of claim 1, wherein the computer network information includes predictive connection information for use by the switch for establishing a second connection between the client and a second server of the plurality of servers.

20. The method of claim 19, wherein the predictive connection information is determined by the first server using at least connection information associated with the first connection through the switch between the client and the first server, and wherein the first connection is associated with the second connection.

21. The method of claim 19, wherein the computer network information includes an alias of a computer network address of the second server.

22. A system for communicating information in a computer network, comprising:
a first server of a plurality of servers for constructing an original state of an information packet for transmitting client information to a client on a first connection between the client and the first server, for modifying a header of the information packet to include computer network information, and for transmitting the modified information packet; and
a switch, connected between the client and the plurality of servers, for receiving the modified information packet from the first server, for extracting the computer network information from the modified information packet, and for using the computer network information from the first server, wherein the first server calculates a first verification value to be included in the information packet, wherein the first server uses the client information to calculate the first verification value, and the first server calculates a second verification value to be included in the information packet, wherein the first server uses the first verification value. the client information, and the computer network information to calculate the second verification value.

23. The system of claim 22, wherein the switch removes modifications made to the information packet after the switch has extracted the computer network information from the modified information packet, to return the information packet to the original state.

24. The system of claim 23, wherein the switch forwards to the client the modified information packet from which the computer network information has been removed.

25. The system of claim 22, wherein the computer network information is control information associated with the client information included in the information packet.

* * * * *

UNITED STATES PATENT AND TRADEMARK OFFICE
CERTIFICATE OF CORRECTION

PATENT NO.        : 7,594,032 B2                                              Page 1 of 1
APPLICATION NO.   : 10/289282
DATED             : September 22, 2009
INVENTOR(S)       : David Andrew Thomas It is certified that error appears in the above-identified patent and that said Letters Patent is hereby corrected as shown below:

In column 16, line 54, in Claim 1, delete "though" and insert -- through --, therefor.

In column 17, line 16, in Claim 4, delete "though" and insert -- through --, therefor.

In column 18, line 42, in Claim 22, delete "value." and insert -- value, --, therefor.

Signed and Sealed this

Fourteenth Day of September, 2010

David J. Kappos
*Director of the United States Patent and Trademark Office*